(12) United States Patent
Peterson, III et al.

(10) Patent No.: US 11,927,820 B2
(45) Date of Patent: Mar. 12, 2024

(54) FIBER OPTIC DROP ASSEMBLY

(71) Applicant: Certicable, LLC, Lindenhurst, NY (US)

(72) Inventors: Christian A. Peterson, III, Farmingdale, NY (US); Barry Skolnick, Farmingdale, NY (US)

(73) Assignee: Certicable, LLC, Lindenhurst, NY (US)

( * ) Notice: Subject to any disclaimer, the term of this patent is extended or adjusted under 35 U.S.C. 154(b) by 0 days.

(21) Appl. No.: 17/314,077

(22) Filed: May 7, 2021

(65) Prior Publication Data

US 2022/0357540 A1 Nov. 10, 2022

(51) Int. Cl.
*G02B 6/54* (2006.01)
*G02B 6/44* (2006.01)
*G02B 6/46* (2006.01)

(52) U.S. Cl.
CPC ......... *G02B 6/4432* (2013.01); *G02B 6/4436* (2013.01); *G02B 6/545* (2023.05); *G02B 6/562* (2023.05)

(58) Field of Classification Search
CPC .............................. G02B 6/4432; G02B 6/545
See application file for complete search history.

(56) References Cited

U.S. PATENT DOCUMENTS

| | | | | |
|---|---|---|---|---|
| 5,039,196 A | * | 8/1991 | Nilsson ............... | G02B 6/4465 294/102.1 |
| 2003/0012530 A1 | * | 1/2003 | Yamasaki ............ | G02B 6/4482 385/100 |
| 2007/0183729 A1 | * | 8/2007 | Chase ................. | C03C 25/1065 385/128 |
| 2011/0075979 A1 | * | 3/2011 | Ma ....................... | G02B 6/4427 385/107 |
| 2011/0268400 A1 | * | 11/2011 | Lovie ................... | G02B 6/4432 385/113 |
| 2013/0294735 A1 | * | 11/2013 | Burris ................. | G02B 6/4471 385/101 |
| 2018/0188464 A1 | * | 7/2018 | Peterson, III ....... | G02B 6/4433 |
| 2020/0192049 A1 | * | 6/2020 | Kumar ................ | G02B 6/4404 |

* cited by examiner

*Primary Examiner* — Charlie Y Peng
(74) *Attorney, Agent, or Firm* — Brooks Kushman P.C.

(57) ABSTRACT

The specification relates to a fiber optic cable assembly. The fiber optic cable assembly includes: an outer sheath; fiberglass reinforced panels; a pull material; an inner jacket; a strength material; non-interlocking armor; and a tight buffer of optical fibers.

19 Claims, 4 Drawing Sheets

2.Cable construction details

| Number of fiber | | 1F |
|---|---|---|
| Fiber type | | G657A2 |
| Strength member | Material | Kevlar yarn |
| | | φ1.5FRP*2 |
| Tight buffer | Material | LSZH |
| | Color | White |
| | Diameter | 0.9±0.05mm |
| Armored steel tube | Material | LSZH |
| | Diameter | 1.7±0.1mm |
| Inner sheath | Material | LSZH |
| | Color | Yellow |
| | Diameter | 2.9±0.1mm |
| Outer sheath | Material | OFNP |
| | Color | Black |
| | Diameter | 4.0±0.2x7.2±0.2mm |

Figure 2

3. Cable Mechanical characteristic

| Min Bending Radius(mm) | Long term | 20D |
|---|---|---|
| Min BendingRadius(mm) | Short term | 10D |
| Max Tensile Strength(N) | Long term | 800 |
| | Short term | 1600 |
| Crush Load (N/100mm) | Long term | 1000 |
| | Short term | 2000 |
| Operationtemperature ℃ | | -20+70 |
| Installationtemperature ℃ | | -10+60 |

Figure 3

4. Fiber characteristic

| Characteristics | Conditions | Specified Values | Unit |
|---|---|---|---|
| Attenuation | 1310nm | ≤0.4 | dB/KM |
| | 1550nm | ≤0.3 | dB/KM |
| Attenuation vs.Wavelength Max. difference | 1285-1330nm | ≤0.03 | dB/KM |
| | 1525-1575nm | ≤0.02 | dB/KM |
| Zero dispersion wavelength | | 1312±10 | nm |
| Zero dispersion slope | | ≤0.090 | $ps/nm^2 \cdot km$ |
| PMD | | - | |
|   Maximum Individual Fiber | | ≤0.2 | $ps/\sqrt{km}$ |
|   Link Design Value (M=20,Q=0.01%) | | ≤0.1 | $ps/\sqrt{km}$ |
|   Typical value | | 0.04 | $ps/\sqrt{km}$ |
| Cable cutoff wavelength λcc | | ≤1260 | nm |
| Mode field diameter (MFD) | 1310nm | 9.2±0.4 | um |
| | 1550nm | 10.4±0.5 | um |
| Effective group index of refraction | 1310nm | 1.466 | - |
| | 1550nm | 1.467 | - |
| Point discontinuities | 1310nm | ≤0.05 | dB |
| | 1550nm | ≤0.05 | dB |
| Geometrical Characteristics | | | |
| Cladding diameter | | 124.8±0.7 | um |
| Cladding non-circularity | | ≤0.7 | % |
| Coating diameter | | 254±5 | um |
| Coating-cladding concentricity error | | ≤12.0 | um |
| Coating non-circularity | | ≤6.0 | % |
| Core-cladding concentricity error | | ≤0.5 | um |
| Curl (radius) | | ≥4 | m |

Figure 4

FIBER OPTIC DROP ASSEMBLY

BACKGROUND

The disclosed technology relates generally to a fiber optic drop assembly.

Traditionally, fiber optic assemblies include optical fibers that conduct light for transmitting voice, video and/or data. The construction of fiber optic cables preserves optical performance of the fibers when deployed in an intended environment while also meeting official standards for the environment. For instance, indoor cables for riser and/or plenum spaces may require certain flame-retardant ratings to meet the demands of the space. These flame-retardant ratings can be in addition to mechanical requirements or desired characteristics for the space, e.g., crush performance, permissible bend radii, temperature performance, and the like. These characteristics are desired to inhibit undesirable optical attenuation or impaired performance during installation and/or operation within the space.

By way of example, outdoor applications can use a fiber optic cable disposed within an armor layer for providing improved crush performance in underground and overhead transmission configurations. For instance, conventional armored constructions have a fiber optic cable disposed within a metallic interlocking armor. This interlocking armor can be wound about the fiber optic cable so that the edges of the adjacent wraps of armor mechanically interlock forming an interlocked armor layer with a large bend radius, e.g., greater than 75 mm and a large outside diameter (OD), e.g., 12.5 mm.

SUMMARY

This specification describes technologies relating to a fiber optic assembles that allow fiber optic cable assemblies to be installed in a variety of cable runs, e.g., inground or above-ground outdoor applications.

In one implementation, a fiber optic cable assembly can comprise: an outer sheath; fiberglass reinforced panels; a pull material; an inner jacket; a strength material; non-interlocking armor; and a tight buffer of optical fibers.

In some implementations, the outer sheath can have an OFNP rating for outdoor applications. In some implementations, the outer sheath can be a UV resistant jacket. In some implementations, the outer sheath can include print to ensure product identification and fiber compatibility. In some implementations, the fiberglass reinforced panels can be incorporated into the outer sheath to increase a rigidity of the outer sheath.

In some implementations, the outer pull material can be a plurality of aramid fibers. In some implementations, the inner jacket can provide a layer of protection for the tight buffer of the optic fibers and can be flame-retardant. In some implementations, the inner jacket can be color-coded to identify the optical fibers with in the tight buffer.

In some implementations, the non-interlocking armor can be a stainless-steel tube. In some implementations, the non-interlocking armor can be a spiral tube having a gap between each spiraling ring. In some implementations, the strengthening material can at least partially surround the tight buffer of optical fibers and can be a plurality of aramid fibers. In some implementations, the tight buffer of optical fibers can be one or more optical fibers, a core and a cladding layer.

In some implementations, the fiber optic cable assembly can have a long-term minimum bending radius of 20 D where 20 D is defined as twenty times the nominal diameter. In some implementations, the fiber optic cable assembly can have a short-term minimum bending radius of 10 D where 10 D is defined as ten times the nominal diameter. In some implementations, the fiber optic cable assembly can have a long-term max tensile strength of 800 N. In some implementations, the fiber optic cable assembly can have a short-term max tensile strength of 1600 N. In some implementations, the fiber optic cable assembly can have a long-term crush resistance of 100 N/100 mm. In some implementations, the fiber optic cable assembly can have a short-term crush load of 2000 N/100 mm. In some implementations, the fiber optic cable assembly can have an operational temperature of −20 to 70 degrees Fahrenheit. In some implementations, the fiber optic cable assembly can have an installation temperature of −10 to 60 degrees Fahrenheit.

The advantages of the disclosed fiber optic cable is that it is highly flexible and thin but capable of maintaining rigidity for longer runs when running cable thereby making the cable much easier to install and saving space in inground or above ground outdoor applications, e.g., outdoor direct burial thru conduits or micro ducts.

BRIEF DESCRIPTION OF THE DRAWINGS

FIG. 2 is a chart detailing construction details of the fiber optic assembly of the disclosed technology;

FIG. 3 is a chart detailing mechanical characteristics of the fiber optic assembly of the disclosed technology; and FIG. 4 is a chart detailing optical fiber characteristics of the fiber optic assembly of the disclosed technology.

DETAILED DESCRIPTION

Figure 1:
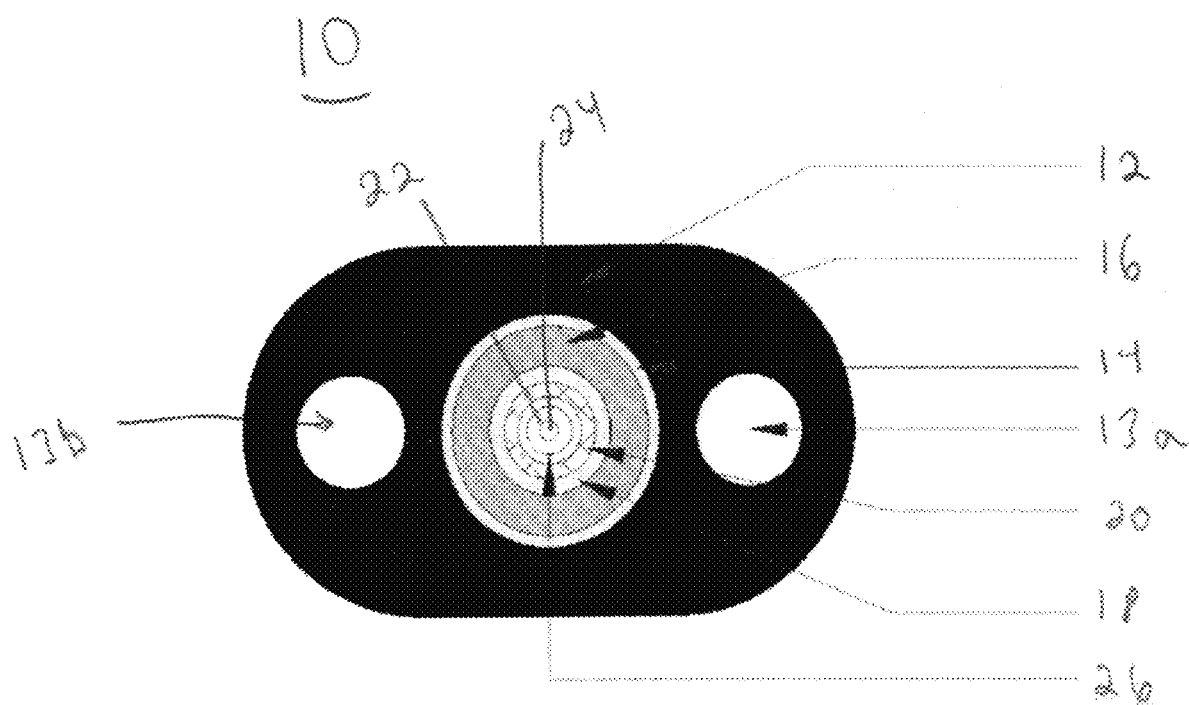
FIG. 1 shows a cross-sectional view of a fiber optic assembly of the disclosed technology.

This specification describes technologies relating to fiber optic cable drop assemblies. The fiber optic cable of the disclosed technology is a flexible and armored fiber optic cable that allows the flexible and armored fiber optic cable assemblies to be installed in a variety of cable runs, e.g., plenums, data centers, cable trays, under raised floors and inground or above ground outdoor applications, e.g., outdoor direct burial thru conduits or micro ducts.

Fiber optic cable assemblies refer to the complete assembly of fibers, e.g., buffer tubes, ripcords, stiffeners, strengthening material, outer and inner protective coverings, etc. Fiber optic cable assemblies provide protection for the optical fiber or fibers within the environment in which the cable is installed. Fiber optic cable assemblies come in many different types, depending on the number of fibers and how and where it will be installed.

A function of the cable assembly is to protect the fibers from the environment encountered in and after installation, e.g., will the cable: (1) become wet or moist; (2) have to withstand high pulling tension for installation in conduit or continual tension as in aerial installations; (3) have to be flame-retardant; (4) be installed around tight bends; (5) be exposed to chemicals; (6) have to withstand a wide temperature range; (7) be gnawed on by rodents; (8) be exposed to any other environmental issues; and (9) withstand an underground installation or a direct burial.

The bend radius is of particular importance in the handling of fiber optic cables. The minimum bending radius varies with different cable designs. That is, optical fiber is sensitive to stress, particularly bending. When stressed by bending, light in the outer part of the core is no longer guided in the core of the fiber so some is lost, coupled from the core into the cladding, creating a higher loss in the stressed section of the fiber. Fiber coatings and cables are designed to prevent as much bending loss as possible, but it is part of the nature of the fiber design. Bending losses are a function of the fiber type (e.g., single mode or multimode), fiber design (e.g., core diameter and numerical aperture), transmission wavelength (e.g., longer wavelengths are more sensitive to stress) and cable design (e.g., fire resistance and/or crush resistance). The normal recommendation for fiber optic cable bend radius is the minimum bend radius under tension during pulling is 20 times the diameter of the cable. When not under tension, the minimum recommended long term bend radius is 10 times the cable diameter. Besides mechanical destruction, excessive bending of fiber-optic cables can cause microbending and macrobending losses. Microbending causes light attenuation induced by deformation of the fiber while macrobending loss refers to losses induced in bends around mandrels or corners in installations.

To avoid microbending and macrobending issues, bend insensitive fiber have been developed. Bend insensitive (BI) fiber cable offers greater flexibility in demanding environments than traditional fiber cable. It is typically used in data centers or any space constrained area where tight bends and flexibility are required. Bend-insensitive fibers may add a layer of glass around the core of the fiber which has a lower index of refraction that literally "reflects" weakly guided modes back into the core when stress normally causes them to be coupled into the cladding. In some fibers, a trench, or moat, surrounds the core in both BI single mode fiber (SMF) and BI multi-mode fiber (MMF) to reflect lost light back into the core. The trench is an annular ring of lower index glass surrounding the core with very carefully designed geometry to maximize the effect. Bend-insensitive fiber has obvious advantages. In patch panels, it does not suffer from bending losses where the cables are tightly bent around the racks. In buildings, it allows fiber to be run inside molding around the ceiling or floor and around doors or windows without inducing high losses. It is also guards against problems caused by careless installation.

Many applications for BI SMF are in premises installations like apartment buildings or for patchcords, where it simplifies installation and use. BI SMF is also used in outside plant cables since it allows fabrication of smaller, lighter high fiber count cables.

In many applications where BI fiber is used, the fiber may be exposed to crush loads, e.g., when used in an underground direct burial, or destruction by rodents. The problem that arises is that the armor used to protect standard fiber has a bend radius of usually <75 and an OD of 12.5 mm. When used in applications with tight bend area, the armored cable either does not fit into tight spaces due to its large OD and/or does not conform to a necessary bend. In these cases, unarmored fiber optic cables are used. This leaves open the possibility of the cable being crushed or cut.

Another problem with fiber is that some fiber assemblies does not have rigidity for installing a cable assembly through a long run. That is, the proper method of pulling fiber optic cables is always to attach a pull rope, wire or tape to the pull material. In these installations, fish tape can be utilized to extend from one side of a long run to the other. Once ran, the fiber assembly can be attached to the fish tape and pulled to the desired location. Using fish tape has its own set of problems, e.g., the attachment gets undone in the middle of the run and needs to be further secured. Also, there is cost of buying the fish tape and having a proper length for your installation project.

The subject matter of the disclosed technology overcomes these problems by incorporating an outer sheath that includes a rigid material as an outer layer of the fiber optic assembly so that the assembly can be installed safety and durably in all outdoor applications.

As shown in FIG. 1, the fiber optic cable assembly 10 can include an outer sheath 12, fiberglass reinforced panels 13a, 13b, a pull material 14, an inner jacket 16, a strength material 18, a non-interlocking armor 20, and a tight buffer of optical fibers 22. See FIG. 2 and below for an example of construction details for the fiber optic cable assembly 10.

The outer sheath 12 is the outermost layer of protection for the tight buffer 22 and is chosen to withstand the environment in which the cable assembly 10 is installed. The outer sheath 12 will generally be OFNP for indoor/outdoor applications. OFNP is the designation given by the National Fire Protection Association (NFPA) to fiber optic cables which contain no electrically conductive component. The outer sheath 12 can be a UV resistant jacket. The outer sheath 12 can include print to ensure product identification and fiber compatibility. The disclosed outer sheath 12 can be a durable jacket that offers superior protection during installation and in rugged use application, e.g., direct underground burial. To increase the rigidity of the outer sheath 12, fiberglass reinforced panels 13a, 13b can be incorporated into the outer sheath 12.

Beneath the outer sheath 12, is the outer pull material 14. The outer pull material 14 can be aramid fibers along with a water backing material, e.g., Kevlar yarn. The outer pull material 14 can be used to absorb any tension that is created when pulling the fiber optic cable assembly 10 during installation. Aramid fibers can be used due to their strength and the fact that they do not stretch. If pulled hard, the aramid fibers will not stretch but may eventually break when tension exceeds their limits. For short term stresses, the maximum tension is approximately 800 N. For long term stresses, the maximum tension is approximately 600 N.

Also beneath the outer sheath 12 is the inner jacket 16. The inner jacket 16 is a layer of protection for the tight buffer 20 of fiber optic cables. The inner jacket 16 is chosen to withstand the environment in which the fiber optic cable assembly 10 is installed. The inner jacket 16 can be a flame-retardant jacket that can be color-coded to identify the fibers with in the tight buffer 22 inside the fiber optic cable assembly 10, e.g., PVC, LSZH, TPU, ETFE or OFNP. The inner jacket 16 can have a thickness of approximately 0.25 mm-1.5 mm and come in a variety of colors, e.g., yellow, orange, aqua, blue, etc. In some cases, the color of the inner jacket 16 is the same as the color for the outer jacket 10.

The non-interlocking armor 20 can be made from a stainless-steel tube, e.g., SUS 204. The benefit of using a non-interlocking armor is that the bend radius is substantially smaller than a bend radius of an interlocked steel tube. It is also much lighter and easier to work with. The non-interlocking armor 20 can be a spiral tube having a gap between each spiraling ring, the gap can be 0.05 mm to 1 mm. The non-interlocking armor 20 can be a spiral tube having an outer diameter of approximately 1.5 mm-5.5 mm, a thickness of approximately 0.25 mm-0.75 mm and an inner diameter of approximately 0.75 mm-5.25 mm. The armor has a crush resistance of approximately ≥100 KGf/100 mm. The armor 14 offers increased crush protection, higher axial strength and corrosion resistance. However, other armored steel tubes are contemplated.

The strengthening material 20 at least partially surrounds the tight buffer of optical fibers 22. The strengthening material 20 may be formed of any suitable material. According to some embodiments, the strengthening material 20 can be aramid fibers. Other suitable materials can include fiberglass or polyester. The strengthening material 20 can be aramid fibers which can absorb the tension needed to pull the inner cable and provide cushioning for the tight buffer of optical fibers 22, thus ensuring that the optical fibers do not stretch or bind within the cable.

The tight buffer of optical fibers 22 can include one or more optical fibers, a core 24 and a cladding layer 26. The core 24 can be a bare optical fiber and the cladding layer 26 can be a nylon both of which can be selected for total internal reflection due to the difference in the refractive index between the two. The bare fiber of the core 24 can also be coated with a layer of acrylate polymer or polyimide. This coating protects the bare fiber of the core 24 from damage but does not contribute to its optical waveguide properties. Individual coated fibers (or fibers formed into ribbons or bundles) then have a tough resin buffer layer and/or core tube(s) extruded around them to form the cable core. A standard fiber has a primary buffer coating of approximately 250 microns and can add a tight buffer coating such as a soft protective coating applied directly to the 250 micron coated fiber to provide additional protection for the fiber, allowing easier handling and even direct termination for the fiber. In some implementations, the optical fibers 22a, 22b can be 62.5/125 μm multimode fibers, 50/125 μm 10G OM3/OM4 fibers, 9/125 μm single mode G.652.D fibers, 9/125 μm single mode bend-insensitive fibers, or any suitable fibers, for example, G.657.A1, G.657.A2, G.657.B1, G.657.B2, G.657.B3. See FIG. 4 for an example of optical fiber characteristics.

The fiber optic cable assembly 10 can have (1) a long-term minimum bending radius of 20 D where 20 D is defined as twenty times the nominal diameter, (2) a short-term minimum bending radius of 10 D where 10 D is defined as ten times the nominal diameter, (3) a long-term max tensile strength of 800 N, (4) a short-term max tensile strength of 1600 N, (5) a long-term crush resistance of 100 N/100 mm, (6) a short-term crush load of 2000 N/100 mm, (7) an operational temperature of −20 to 70 degrees Fahrenheit, (8) an installation temperature of −10 to 60 degrees Fahrenheit. See FIG. 3 for an example of mechanical characteristics.

While this specification contains many specific implementation details, these should not be construed as limitations on the scope of the disclosed technology or of what can be claimed, but rather as descriptions of features specific to particular implementations of the disclosed technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

The foregoing Detailed Description is to be understood as being in every respect illustrative, but not restrictive, and the scope of the disclosed technology disclosed herein is not to be determined from the Detailed Description, but rather from the claims as interpreted according to the full breadth permitted by the patent laws. It is to be understood that the implementations shown and described herein are only illustrative of the principles of the disclosed technology and that various modifications can be implemented without departing from the scope and spirit of the disclosed technology.

The invention claimed is:

1. A fiber optic cable assembly comprising:
an outer sheath;
fiberglass reinforced panels;
an outer pull material;
an inner jacket;
a strength material;
non-interlocking armor; and
a tight buffer of optical fibers,
wherein the outer pull material is a plurality of aramid fibers.

2. The fiber optic cable assembly of claim 1 wherein the outer sheath has an OFNP rating for outdoor applications.

3. The fiber optic cable assembly of claim 1 wherein the outer sheath is a UV resistant jacket.

4. The fiber optic cable assembly of claim 1 wherein the outer sheath includes print to ensure product identification and fiber compatibility.

5. The fiber optic cable assembly of claim 1 wherein the fiberglass reinforced panels are incorporated into the outer sheath to increase a rigidity of the outer sheath.

6. The fiber optic cable assembly of claim 1 wherein the inner jacket provides a layer of protection for the tight buffer of the optic fibers and is flame-retardant.

7. The fiber optic cable assembly of claim 1 wherein the inner jacket is color-coded to identify the optical fibers within the tight buffer.

8. The fiber optic cable assembly of claim 1 wherein the non-interlocking armor is a stainless-steel tube.

9. The fiber optic cable assembly of claim 1 wherein the non-interlocking armor is a spiral tube having a gap between each spiraling ring.

10. The fiber optic cable assembly of claim 1 wherein the strengthening material at least partially surrounds the tight buffer of optical fibers and is a plurality of aramid fibers.

11. The fiber optic cable assembly of claim 1 wherein the tight buffer of optical fibers is one or more optical fibers, a core and a cladding layer.

12. The fiber optic cable assembly of claim 1 wherein the fiber optic cable assembly has a long-term minimum bending radius of 20 D where 20 D is defined as twenty times the nominal diameter.

13. The fiber optic cable assembly of claim 1 wherein the fiber optic cable assembly has a short-term minimum bending radius of 10 D where 10 D is defined as ten times the nominal diameter.

14. The fiber optic cable assembly of claim 1 wherein the fiber optic cable assembly has a long-term max tensile strength of 800 N.

15. The fiber optic cable assembly of claim 1 wherein the fiber optic cable assembly has a short-term max tensile strength of 1600 N.

16. The fiber optic cable assembly of claim 1 wherein the fiber optic cable assembly has a long-term crush resistance of 100 N/100 mm.

17. The fiber optic cable assembly of claim 1 wherein the fiber optic cable assembly has a short-term crush load of 2000 N/100 mm.

18. The fiber optic cable assembly of claim 1 wherein the fiber optic cable assembly has an operational temperature of −20 to 70 degrees Fahrenheit.

19. The fiber optic cable assembly of claim 1 wherein the fiber optic cable assembly has an installation temperature of −10 to 60 degrees Fahrenheit.

\* \* \* \* \*